Oct. 25, 1938.  V. BUSH  2,134,273
ELECTRICAL CONDENSER
Original Filed Oct. 1, 1926
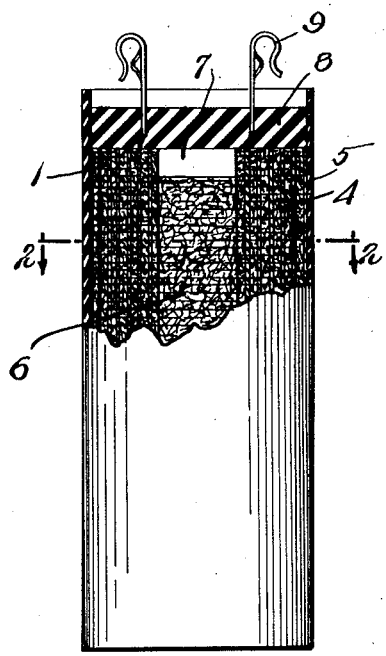
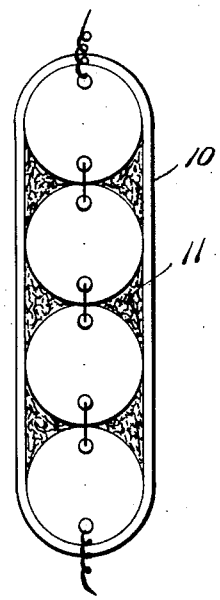
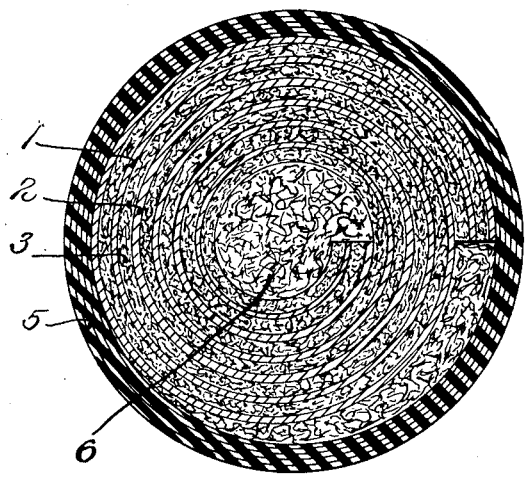
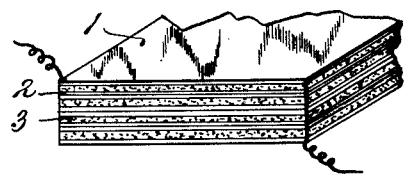
Inventor
Vannevar Bush
by Roberts, Cushman & Woodberry
Attys.

Patented Oct. 25, 1938

2,134,273

UNITED STATES PATENT OFFICE 2,134,273

ELECTRICAL CONDENSER

Vannevar Bush, West Medford, Mass., assignor, by mesne assignments, to Raytheon Manufacturing Company, Newton, Mass., a corporation of Delaware Application October 1, 1926, Serial No. 138,900
Renewed November 22, 1933

10 Claims. (Cl. 175—315)

The present invention relates to devices for the storing of electrical energy and in particular, to a condenser formed by employing electrodes which are immersed in electrolyte and by passing an electric current between the electrodes to produce a film thereon. This film subsequently acts as a dielectric of high constant, the stress of which caused by the applied potential enables the unit to retain energy in electrostatic form.

Now it has been found in condensers heretofore known to the art that upon rupture or leakage of casing enclosing the condenser proper, the film forming liquid evaporates rendering the device useless after a short period of time.

The primary object of my invention therefore is to provide condensers of the above type in which the dielectric forming liquid is hygroscopic whereby solidification is precluded. A further object resides in producing a structure which is substantially devoid of electrolytic action after the dielectric has been formed. Still another object is to devise structure which offers cheapness and simplicity of manufacture but nevertheless, is capable of retaining a large charge for a considerable period of time.

Inasmuch as the condenser described hereinafter has the characteristic of large capacity per unit area, I am able to connect three or four units in series, each of which charges on 1.5 volts and still obtain sufficient capacity in aggregate for practical purposes. Thus the multicondenser unit described hereinafter functions admirably as a low impedance shunt for current ripples ordinarily present in the output circuit of a rectifier supplying a thermionic tube filament circuit of standard potential. While its operation as a current filter is marked, the condenser has a broad field of utility throughout circuits in general which require a condenser of relatively small dimension but capable of absorbing a large charge and sealed to the atmosphere.

With the aforesaid and other objects in view, my invention will be more fully described in relation to the specific embodiments illustrated in the drawing, in which:

Fig. 1 is an elevational view of the condenser with a portion broken away;

Fig. 2 is a transverse section taken along line 2—2 of Fig. 1;

Fig. 3 is a top plan showing a plurality of condenser units made according to my invention and grouped together; and Fig. 4 relates to a multi-condenser unit in flat form.

In the particular embodiment illustrated in Figs. 1 and 2, numerals 1 and 2 designate two sheets of a metal, as aluminum, nickel or one of its alloys as nickel-silicon, which is strongly oxidized when subjected to an electrolyte. However, I prefer to use electrodes of nickel-silicon, the oxidation products of which are stable and of a strongly adhesive character. It will be noted that inasmuch as the electrodes are of like material, the condenser has no initial polarity. At 3, I have indicated a sheet of porous electrically insulating substance, as asbestos, blotting paper, or the like, the function of which is to space the metallic electrodes and to absorb electrolyte or film forming liquid 4. For the latter, I prefer to utilize a hygroscopic or deliquescent liquid, for example potassium acetate ($KC_2H_3O_2$), which, having affinity for water, will absorb moisture from the atmosphere in the event of a punctured, broken or porous container. Due to its ability of extracting water, the acetate remains of the same constituency throughout its life, and accordingly, congealation and solidification are effectively precluded. Now I have found in the operation of my device, that the disassociation products of the halides, particularly chlorine, present in the liquid by way of impurity, tend to disrupt the film of oxide and cause current leakage. However, by adding to the electrolyte, a trace of mercury, the acetate of either lead or silver that yield an insoluble halide, the injurious effects of foreign matter, are removed. While heretofore, I have referred to the liquid as an electrolyte, it is to be distinctly understood that after the film has been formed by the application of potential, my device appears to be substantially devoid of electrolytic action, the acetate performing apparently no function other than that of a mere conductor and accordingly, the container can be sealed and made rugged. In a sense, the condenser may be considered as comprising a metal sheet as one plate and the body of liquid as the other separated by an oxide dielectric. In practice however, the two metal plates are located quite close together and both probably constitute active electrodes.

The condenser is made by rolling the aforesaid sheets on a mandrel, the plate members being separated by the layer of absorbent, the unit taking on a spiral form as shown in Fig. 2 and subsequently enclosed within paper carton 5 soaked in paraffin to waterproof.

Central core 6, left by the mandrel, is packed with asbestos or other porous material preferably in flake form, leaving space 7 between the upper surface of the core and sealing wax cover 8 for gas to collect during the film forming period. Before the seal is applied however, electrolyte is admitted to the container in quantity just sufficient to saturate the absorbing material. At 9, I show two clip terminals to which connection is made from the metallic plates.

The words "formed" or "forming" used throughout the specification and claims refer to the process of producing a current-blocking film on an electrode surface by the passage of current through the device, ordinarily sufficient to produce the liberation of gas as described above.

Fig. 3 illustrates an arrangement for securing together by wrapper 10, a plurality of condensers as a unit. As will be noted the connection in series is such that each condenser is subjected to only a fraction of the applied potential, the fractional amount being sufficient to completely charge the condenser but insufficient to cause appreciable electrolysis except during the film forming period. The spaces 11 are packed with a suitable filling material.

While I have described my condenser as being of cylindrical form, it is obvious that a flat unit comes within the purview of the disclosure. Thus in Fig. 4, I show a condenser stack readily constructed of four complete units having flat form and effectively connected in series as in Fig. 3 by placing the metallic plate of one condenser contiguous with that of the unit adjacent thereto. A single element may replace the double plate if the stack is manufactured as a whole. As in Fig. 1, porous material impregnated with potassium acetate is interposed between the conducting surfaces and if desired, the stack may be placed in a sealed container to facilitate handling.

I claim:

1. A condenser comprising two metallic film forming plates separated by an absorbent containing an electrolyte having a relatively large proportion of potassium acetate.

2. A condenser comprising two film-forming electrodes immersed in a solution containing a relatively large proportion of potassium acetate, and a soluble salt of a metal whose halide is insoluble.

3. A condenser comprising a sealed receptacle enclosing two film forming electrodes separated by a solution of potassium and lead acetates.

4. A condenser comprising two film-forming electrodes immersed in a solution containing a relatively large proportion of potassium acetate, and a halide precipitant.

5. An electrolytic condenser comprising a plurality of plates of an alloy containing a substantial amount of silicon with an electrolyte containing a relatively large proportion of potassium acetate.

6. An electrolytic condenser comprising a plurality of plates of a nickel-silicon alloy with an electrolyte containing a relatively large proportion of potassium acetate.

7. An electrolytic condenser comprising a plurality of sheets of nickel silicon alloy with intervening layers of absorbent material containing a solution having a relatively large proportion of potassium acetate.

8. The condenser of claim 7 with the soluble salt of a metal whose halide is insoluble added to the solution.

9. A condenser comprising two film-forming electrodes immersed in a solution containing a relatively large proportion of potassium acetate.

10. A condenser comprising two film-forming electrodes separated by a solution of potassium and lead acetate.

VANNEVAR BUSH.